United States Patent [19]

Homan et al.

[11] 4,293,676

[45] Oct. 6, 1981

[54] OXYGEN-CURABLE MERCAPTOORGANOSILOXANE COMPOSITIONS CONTAINING BOTH REDOX AND IRON CARBONYL COMPOUNDS AND METHOD OF FORMING HIGHER MOLECULAR WEIGHT PRODUCTS THEREFROM

[75] Inventors: Gary R. Homan; Chi-Long Lee, both of Midland, Mich.

[73] Assignee: Dow Corning Corporation, Midland, Mich.

[21] Appl. No.: 99,253

[22] Filed: Dec. 3, 1979

[51] Int. Cl.$^3$ ............................................. C08G 77/06
[52] U.S. Cl. ................................ 528/15; 260/37 SB; 528/19; 528/30
[58] Field of Search ..................... 528/15, 19, 30; 260/37 SB

[56] References Cited

U.S. PATENT DOCUMENTS

| | | | |
|---|---|---|---|
| 3,445,419 | 5/1969 | Vanderlinde | 260/37 |
| 4,070,328 | 1/1978 | Homan et al. | 260/37 SB |
| 4,070,329 | 1/1978 | Homan et al. | 260/37 SB |
| 4,133,939 | 1/1979 | Bokerman et al. | 428/447 |

OTHER PUBLICATIONS

Nametkin et al., "Synthesis and Some Properties of Sulfur-Containing Iron Tricarbonyl Complexes," Journel of Organometallic Chemistry, Elsevier Sequoia S.A., Lausanne, The Netherlands, 149, pp. 355-370 (1978).

*Primary Examiner*—Melvyn I. Marquis
*Attorney, Agent, or Firm*—Richard E. Rakoczy

[57] ABSTRACT

Compositions, stable in the absence of oxygen, are formed by mixing the following substantially in the absence of oxygen:
(A) 100 parts by weight of at least one mercapto-functional organosiloxane containing at least two mercapto-functional substituents per molecule;
(B) a catalytic amount of an iron carbonyl compound catalyst selected from the group consisting of Fe(CO)$_5$, Fe$_2$(CO)$_9$, Fe$_3$(CO)$_{12}$, dicyclopentadienyldiiron tetracarbonyl, butadieneiron tricarbonyl and cyclohexadieneiron tricarbonyl, preferably from 0.1 to 6 parts by weight of catalyst per 100 parts by weight of part (A);
(C) optionally, at least one filler; and
(D) 0.1 to 6 parts by weight per 100 parts by weight of a redox compound such as copper (II) sulfate or iron (III) oxide.

The compositions polymerize or cure to form higher molecular weight products upon exposure to oxygen. The use of a redox compound appears to increase the cross-link density of the cured composition and results in harder resins and more durable elastomers. An important novel feature of the redox compounds is that their use enables one to formulate compositions which cure to low-modulus elastomers possessing excellent unprimed adhesion to many common substrates such as glass, metal and concrete. Such low-modulus elastomeric compositions are very desirable for use as building sealants.

24 Claims, No Drawings

OXYGEN-CURABLE MERCAPTOORGANOSILOXANE COMPOSITIONS CONTAINING BOTH REDOX AND IRON CARBONYL COMPOUNDS AND METHOD OF FORMING HIGHER MOLECULAR WEIGHT PRODUCTS THEREFROM

BACKGROUND OF THE INVENTION

1. Field of the Invention

This invention relates to compositions including organosiloxane polymers containing sulfur and to a method of forming higher molecular weight products from such compositions. This invention also relates to organosiloxane gels, elastomers and resins containing sulfur.

2. Description of the Prior Art

Compositions containing mercaptoorganosiloxanes free of any vinyl functionality which are polymerized by means of the mercapto groups to resins and sealants are known in the art. For example, in U.S. Pat. No. 4,133,939, Bokerman and Gordon teach a method of coating a substrate with a silicone release coating involving the radiation cure of mercapto-functional polydiorganosiloxane fluids mixed with a sensitizer such as benzophenone. While a radiation curing mechanism is rapid and provides one-package systems which are stable in the absence of heat and light, it is useful only for relatively thin coatings and requires a high intensity radiation source such as ultraviolet light or electron beams.

Peroxide cure of mercaptoorganosiloxanes free of vinyl unsaturation is also known, as is demonstrated by Homan and Lee in U.S. Pat. No. 4,070,329. In that patent, the patentees teach mixtures of mercaptoorganopolysiloxanes, organic peroxides and, optionally, a filler to provide a composition which cures at room temperature or by heating to form elastomers which are useful as sealants and rubber articles. Likewise, Homan and Lee in U.S. Pat. No. 4,070,328 claim the use of mixtures of mercaptoorganopolysiloxanes, organic hydroperoxides, a nitrogen compound and, optionally, a filler to produce a composition which cures at room temperature to elastomers which are useful as sealants and rubber articles. However, the above compositions are not one-package systems, since the polymerization or cure begins immediately upon mixing the ingredients.

Vanderlinde, in U.S. Pat. No. 3,445,419, teaches the production of a type of mercapto-functional copolymer consisting of organosiloxanes with mercapto-functional organic compound segments which are prepared by grafting a mercapto-functional carboxylic acid ester such as pentaerythritol tetrakis(3-mercaptopropionate) onto a vinyl-terminated organosiloxane. When an alkaline catalyst such as an amine is added to the resulting graft-copolymer, there is obtained a composition which is stable in the absence of air, but cures to an elastomer at room temperature upon exposure to air. However, this patent does not suggest the use of iron carbonyl compounds as catalysts for the room temperature polymerization or cure of the compositions hereinafter described, nor does it suggest that redox compounds can be used to improve the final properties of compositions catalyzed by iron carbonyl compounds.

Nametkin, et al., in the *Journal of Organometallic Chemistry*, 149 pp. 355-370 (1978) report that when stoichiometric amounts of $Fe(CO)_5$, $Fe_2(CO)_9$, or $Fe_3(CO)_{12}$ are reacted with thiols of the general formula RSH, where R is an alkyl or aryl radical, in solution, a complex $[RSFe(CO)_3]_2$ and a small amount of the disulfide, RSSR, is produced at room temperature and that $Fe_3(CO)_{12}$ is the most effective catalyst. Thermal decomposition of the complex in n-dodecane solution at 160° C. in the presence of air results in decomposition of the complex to form the disulfide. However, this article does not teach that $Fe(CO)_5$, $Fe_2(CO)_9$ or $Fe_3(CO)_{12}$ will function as a catalyst in non-stoichiometric amounts for the room temperature polymerization or cure of the compositions hereinafter described, nor does it suggest that redox compounds can be used to enhance the cross-link density of the resulting products.

DESCRIPTION OF THE INVENTION

Gary R. Homan and Chi-Long Lee are the applicants named in U.S. patent application Ser. No. 99,252 entitled "Oxygen-Curable Mercaptoorganosiloxane Compositions Catalyzed By Metal Carbonyl Compounds And Method Of Forming Higher Molecular Weight Products Therefrom", filed on Dec. 3, 1979 and assigned to the same assignee as the present invention. In that patent application, Homan and Lee teach that the use of a metal carbonyl catalyst produces compositions which are one-package, storage-stable in the absence of oxygen, and easily cured simply by exposing the composition to an oxygen atmosphere, such as air, or pure oxygen gas. The compositions of the present invention have an advantage over acetoxy-functional, moisture-cured, one-component compositions, such as those found in U.S. Pat. Nos. 3,035,016 and 3,077,465, in that no corrosive by-products are evolved during cure. Compositions which utilize platinum-catalyzed addition of SiH to vinyl are preferably cured by heating when formulated into one-package systems. These one-package platinum catalyzed systems cure very slowly at room temperature. Fast, room temperature cures using this system require two-part formulations while compositions of the present invention are one-package systems which cure much faster than one-package platinum catalyzed systems.

Quite unexpectedly, it was discovered that novel compositions result when redox compounds such as copper (II) sulfate ($CuSO_4$) or iron (III) oxide ($Fe_2O_3$) are included in the compositions taught by Homan and Lee above which are catalyzed by iron carbonyl compounds. Compositions including redox compounds possess the same advantages outlined above as those which do not. Additionally, compositions containing redox compounds appear to attain a higher cross-link density, as evidenced by increased durometer values, when compared to an identical composition which was exposed to oxygen for the same period of time. An important novel feature of the redox compounds is that their use enables one to formulate low modulus elastomeric sealant compositions using relatively large amounts of terminal-functional mercaptopolydiorganosiloxanes compared to the amount of pendant-functional mercaptopolydiorganosiloxanes used. These formulations cure to elastomers especially useful as building sealants when they possess low modulus values at 100 percent elongation (in the range of 210 to 415 kilopascals) and elongation values of greater than 1000 percent at break. Cured compositions of this type generally possess excellent unprimed adhesion to many building substrates such as glass, metal and concrete. Another novel feature of redox compounds is that compositions which normally result in tacky, soft gels upon exposure to oxygen can be cured to tack-free low modulus elastomers when redox compounds are included in the formulation.

This invention relates to a composition of matter, stable in the absence of oxygen, which consists essentially of a product obtained by mixing the following substantially in the absence of oxygen (A) 100 parts by weight of at least one mercapto-functional organosiloxane, said mercapto-functional organosiloxane having an average of at least two mercapto-functional siloxane units per molecule selected from the group consisting of mercapto-functional siloxane units of the average unit formula

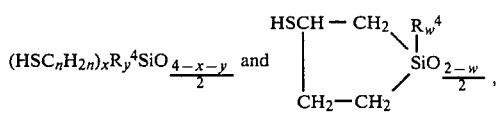

any other siloxane units present having the average unit formula

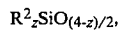

wherein
each $R^2$ is a hydroxyl radical or an organic radical selected from the group consisting of $R^4$ and 3,3,3-trifluoropropyl radicals,
each $R^4$ is $R^3$ or $OR^1$,
each $R^3$ is an alkyl radical of 1 to 4 inclusive carbon atoms or phenyl radical,
each $R^1$ is an alkyl radical of 1 to 4 inclusive carbon atoms,
n has a value of from 2 to 4 inclusive,
w has a value of from 0 to 1 inclusive,
x has a value of from 1 to 2 inclusive,
y has a value of from 0 to 2 inclusive,
z has a value of from 0 to 3 inclusive and the sum of x+y has a value of from 1 to 3 inclusive, and the ratio of total $R^3$, $HSC_nH_{2n}$—,

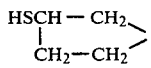

and 3,3,3-trifluoropropyl radicals to silicon atoms in the mercapto-functional organosiloxane is in the range of 0.98/1 to 3.00/1;

(B) a catalytic amount of an iron carbonyl catalyst selected from the group consisting of $Fe(CO)_5$, $Fe_2(CO)_9$, $Fe_3(CO)_{12}$, dicyclopentadienyldiiron tetracarbonyl, butadieneiron tricarbonyl, and cyclohexadieneiron tricarbonyl;

(C) 0 to 200 parts by weight of at least one filler; and (D) 0.1 to 6 parts by weight of a redox compound selected from the group consisting of copper (II) sulfate and iron (III) oxide.

This invention also relates to a method of forming a higher molecular weight product which consists essentially of the steps of (I) mixing 100 parts by weight of at least one of the mercapto-functional organosiloxanes defined in (A) above, a catalytic amount of an iron carbonyl catalyst defined in (B) above and 0.1 to 6 parts by weight of a redox compound as defined in (D) above, to form a mixture and (II) exposing said mixture to oxygen. This invention further relates to the product obtained by exposing the above composition or mixture to oxygen.

"Oxygen" is intended to mean gaseous oxygen which can be in the form of pure oxygen gas or atmospheric oxygen. Mercapto-functional organosiloxanes will also be referred to as mercaptoorganosiloxanes and includes disiloxanes, trisiloxanes and polysiloxanes consisting of siloxane units, some of which are mercapto-functional. Techniques for mixing compositions which are oxygen or moisture sensitive are well-known in the art. Bread dough mixers can be used for viscous mercaptoorganosiloxanes and low-shear mixers can be used for lower viscosity compositions.

This invention has two aspects. One is a novel method of polymerizing or curing mercapto-functional organosiloxanes to form higher molecular weight products. The other is directed toward the formation of storage-stable compositions. In order to accomplish the first aspect, one merely exposes a mixture of the mercapto-functional organosiloxane, a redox compound and an iron carbonyl catalyst to oxygen. Thus, if storage stability is not required, the mercapto-functional organosiloxane, redox compound and iron carbonyl catalyst can be mixed together, preferably in that order, in the presence of oxygen and immediately allowed to polymerize or cure.

When storage-stable compositions are desired, the ingredients are mixed in the substantial absence of oxygen by any well-known means. The preferred procedure is to mix the mercaptoorganosiloxanes, filler, if any, and redox compound under a dry nitrogen atmosphere. The mixture can then be subjected to a vacuum, such as 30 millimeters of mercury, for a short time to remove any trapped oxygen and water. The catalyst can then be added, preferably as a solution in a suitable solvent or diluent such as toluene, mineral oil or trimethylsiloxy endblocked polydimethylsiloxane fluid. Iron carbonyl compounds are generally known to be oxidized by exposure to oxygen, so the compounds should not be excessively exposed to the atmosphere during handling. It is therefore preferable that the mixed compositions be substantially free of exposure to oxygen during storage to maximize storage life. Therefore, the containers used to store the catalyzed compositions should be carefully selected to avoid materials which are sufficiently oxygen permeable to appreciably affect storage stability.

The substituents attached to silicon atoms can be $R^2$ which can be hydroxyl, $R^4$ or 3,3,3-trifluoropropyl radicals. $R^4$ can be $R^3$ which can be alkyl radicals of 1 to 4 inclusive carbon atoms, such as methyl, ethyl, propyl, isopropyl and butyl, phenyl radicals, or alkoxy radicals of the formula $OR^1$, where $R^1$ is an alkyl radical of 1 to 4 inclusive carbon atoms, such as methoxy, ethoxy, isopropoxy and butoxy. The mercapto-functional substituents present in the form of $HSC_nH_{2n}$, where n is 2 to 4, can be, for example, betamercaptoethyl, gamma-mercaptopropyl, 3-mercaptobutyl, and 3-mercapto, 2-methylpropyl. Another mercapto-functional substituent can be 2-mercaptotetramethylene where both ends of the radical are attached to the same silicon atom.

The siloxane units containing no mercapto groups which have the average unit formula $R_z{}^2SiO_{(4-z)/2}$ can be $SiO_2$ units, monosubstituted units such as monomethylsiloxane units, monoethylsiloxane units, monopropylsiloxane units, monobutylsiloxane units, or monophenylsiloxane units; disubstituted units such as dimethylsiloxane units, diethylsiloxane units, diphenylsiloxane units, phenylmethylsiloxane units, methylbutylsiloxane units, phenylethylsiloxane units, 3,3,3-trifluoropropylmethylsiloxane units, and methylisopropylsiloxane units; and trisubstituted units such as trimethylsiloxane units, phenyldimethylsiloxane units, triethylsiloxane units, diphenylmethylsiloxane units, diphenylisopropylsiloxane units, 3,3,3-trifluoropropyldimethylsiloxane units, diphenylbutylsiloxane units and triphenylsiloxane units.

The mercapto-functional siloxane units which have the average unit formula $(HSC_nH_{2n})_xR_y^4SiO_{(4-x-y)/2}$ or

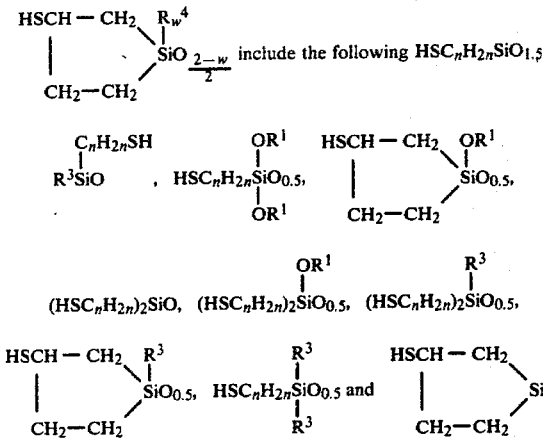

wherein $R^1$, $R^3$ and n are as defined above and n preferably has a value of 3. Mercaptoorganosiloxanes useful in the present invention contain an average of at least two mercapto-functional siloxane units per molecule.

The cured products of this invention can range in properties from soft gels to elastomers to hard resins. Physical properties such as durometer value and hardness are related to cross-link density. Cross-link density can be varied by several mechanisms. One mechanism is by adjusting the ratio of organic substituents (total alkyl, mercapto-functional, 3,3,3-trifluoropropyl, and phenyl substituents) bonded through Si-C bonds to silicon. Generally, the lower the ratio, the harder the cured product will be when all other variables, such as types of substituents and structure, are kept equal. In elastomeric products, higher durometer values generally indicate an increase in cross-link density. Another means for varying the cross-link density is to change the number of mercapto-functional siloxane units per molecule in the mercaptoorganosiloxane. A novel means for increasing the cross-link density is the use of redox compounds in the formulation.

Compositions consisting only of mercaptoorganosiloxanes which contain an average of only two mercapto groups per molecule are generally only capable of chain-extension when exposed to oxygen and thus produce higher molecular weight gums which could find utility as encapsulants. Compositions containing an average of more than two mercapto groups per molecule are capable of polymerizing in the presence of oxygen to form three-dimensional networks which can range from soft gels where the average number of mercapto groups is close to two to hard resins where the mole percent of mercapto-functional siloxane units based on the total number of siloxane units in the mercapto-organosiloxane approaches 100 percent.

The compositions of the present invention are especially useful in forming elastomeric products with tack-free surfaces which are produced by simply exposing the composition to air. Compositions curable to elastomers with a wide variety of physical properties can easily be formulated by selecting the proper mercapto-functional polydiorganosiloxanes.

Pendant-functional mercaptopolydiorganosiloxanes useful in compositions of the present invention are mercaptopolydiorganosiloxanes containing $R_3{}^3SiO_{0.5}$ or $R_2{}^3(HO)SiO_{0.5}$ endblocking siloxane units and mercapto-functional siloxane units selected from the group consisting of

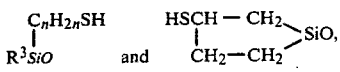

any remaining siloxane units being $R_2{}^3SiO$, wherein $R^3$ and n are defined above, the average number of mercapto-functional siloxane units per molecule is greater than 2 and the number average molecular weight of the pendant-functional mercaptopolydiorganosiloxane is less than 400,000. Compositions consisting solely of pendant-functional mercaptopolydiorganosiloxanes can result in products which range in properties from soft gels to elastomers to hard resins when exposed to oxygen.

When pendant-functional mercaptopolydiorganosiloxanes are used as the sole type of mercaptoorganosiloxane in formulations curable to elastomers, it is preferred that $R^3$ is methyl, n is 3, and the pendant-functional mercaptopolydiorganosiloxane has a number average molecular weight of less than 100,000 and contains a sufficient number of mercapto-functional siloxane units to result in a percentage of mercapto groups in the range of 0.1 to 2.5 percent based on the total weight of pendant-functional mercaptopolydiorganosiloxane.

Terminal-functional mercaptopolydiorganosiloxanes useful in elastomeric sealant, gel and gum formulations as chain-extending polymers are mercaptopolydiorganosiloxanes containing mercapto-functional siloxane units selected from the group consisting of $HSC_nH_{2n}(R^3)_2SiO_{0.5}$, $HSC_nH_{2n}(R^1O)_2SiO_{0.5}$,

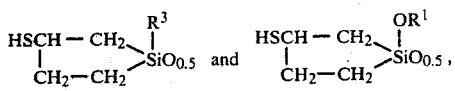

any remaining siloxane units being $R_2{}^3SiO$, wherein $R^3$, $R^1$ and n are defined above and the number average molecular weight of the terminal-functional mercaptopolydiorganosiloxane is less than 400,000. Preferably, each $R^3$ is methyl, the mercapto-functional siloxane units are selected from the group consisting of $HSCH_2CH_2CH_2(CH_3)_2SiO_{0.5}$ and

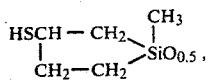

the number average molecular weight of the mercaptopolydiorganosiloxane is less than 100,000 and the weight percentage of mercapto groups present is in the range of 0.07 to 0.5 percent of the total weight of terminal-functional mercaptopolydiorganosiloxane. Polymerization of terminal-functional structures alone generally produces gums because only linear chain-extension is possible.

Another type of mercaptopolydiorganosiloxane useful in compositions of the present invention is a terminal-functional mercaptopolydiorganosiloxane which also contains pendant mercapto-functional siloxane units (hereinafter referred to as hybrid-functional mercaptopolydiorganosiloxanes). Such mercaptopolydiorganosiloxanes contain two terminal mercapto-functional siloxane units selected from the group consisting of $(HSC_nH_{2n})R_2^3SiO_{0.5}$, $(HSC_nH_{2n})(R^1O)_2SiO_{0.5}$,

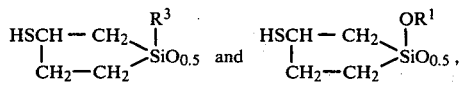

and at least one mercapto-functional siloxane unit selected from the group consisting of siloxane units of the formula $(HSC_nH_{2n})R^3SiO$ and

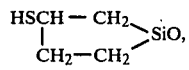

any remaining siloxane units being $R_2^3SiO$, wherein $R^3$, $R^1$ and n are defined above and the number average molecular weight of the hybrid-functional mercaptopolydiorganosiloxane is less than 400,000. Compositions consisting solely of hybrid-functional mercaptopolydiorganosiloxanes can result in products which range in properties from soft gels to elastomers to hard resins when exposed to oxygen.

Hybrid-functional mercaptopolydiorganosiloxanes are quite versatile and can be used as the sole type of mercaptopolydiorganosiloxane in formulations which cure to elastomers. In such formulations, it is preferred that each $R^3$ is methyl, the terminal mercapto-functional siloxane units are selected from the group consisting of $HSCH_2CH_2CH_2(CH_3)_2SiO_{0.5}$ and

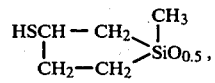

and the hybrid-functional mercaptopolydiorganosiloxane has a number average molecular weight of less than 100,000 and contains a sufficient number of mercapto-functional siloxane units to result in a weight percentage of mercapto groups in the range of 0.1 to 3 percent based on the total weight of hybrid-functional mercaptopolydiorganosiloxane. Hybrid-functional mercaptopolydiorganosiloxanes can be produced which cure to elastomeric products which range in properties from soft products with high elongation values to hard products which are not easily elongated by adjusting the molecular weight and/or the weight percent of mercapto groups in the mercaptopolydiorganosiloxane.

Blends of pendant- and terminal-functional mercaptopolydiorganosiloxanes can be used to obtain cured products which range in properties from soft gels to hard resins or from gums to hard rubbers. Likewise, the properties of hybrid-functional mercaptopolydiorganosiloxanes can also be altered by blending them with terminal-functional mercaptopolydiorganosiloxanes. To obtain blends which cure to elastomers, it is preferred that mercaptopolydiorganosiloxanes which are within the aforementioned preferred ranges for the mercaptopolydiorganosiloxanes be used. Thus, a blend of pendant- and terminal-functional mercaptopolydiorganosiloxanes would contain at least 0.1, but less than 2.5, weight percent of mercapto groups based upon the total weight of the mercaptopolydiorganosiloxanes in the blend while a blend of hybrid- and terminal-functional mercaptopolydiorganosiloxanes would contain at least 0.1, but less than 3, weight percent mercapto groups based upon the total weight of the mercaptopolydiorganosiloxanes in the blend.

The methods for preparing the above mercaptopolydiorganosiloxanes are well-known in the art. One method for making a type of pendant-functional mercaptopolydiorganosiloxane containing $HSC_nH_{2n}(R^3)SiO$ and $R_3^3SiO_{0.5}$ siloxane units is taught by Viventi in U.S. Pat. No. 3,346,405. Another method is taught in the Bokerman, et al, patent described previously. For example, Example 1 of the Bokerman, et al, patent teaches the production of a pendant-functional mercaptopolydiorganosiloxane which is a trimethylsiloxy-endblocked copolymer consisting of about 94 mole percent dimethylsiloxane units and about 5 mole percent 3-mercaptopropylmethylsiloxane units. Pendant-functional mercaptopolydiorganosiloxanes containing $HSC_nH_{2n}(R^3)SiO$ and $(HO)R_2^3SiO_{0.5}$ siloxane units can be produced by modifying the Viventi or Bokerman, et al, methods above. For example, such hydroxylendblocked mercaptopolydiorganosiloxanes can be produced by omitting the addition of triorganochlorosilane from the reaction mixture in the method taught by Viventi. Le Grow, in U.S. Pat. No. 3,655,713 teaches a procedure for making both pendant-functional and terminal-functional mercaptopolydiorganosiloxanes containing siloxane units possessing 2-mercaptotetramethylene substituents.

Several methods for producing terminal-functional mercaptodiorganosiloxanes containing $HSC_nH_{2n}R_2^3SiO_{0.5}$ siloxane units are known. One method involves the use of a disiloxane bearing a silicon-bonded mercaptoalkyl radical, such as sym-tetramethyl bis(3-mercaptopropyl)-disiloxane, and a cyclic polydiorganosiloxane such as octamethylcyclotetrasiloxane. Appropriate amounts of the mercapto-functional disiloxane and cyclic polydiorganosiloxane are heated together with an acidic catalyst such as trifluoromethanesulfonic acid for 3 to 8 hours. The mixture is then neutralized and the mercapto-terminated polydiorganosiloxane is recovered. Hybrid-functional polymers can be prepared using the same type of compounds and techniques outlined above for producing terminal-functional mercaptopolydiorganosiloxanes by adding a cyclic mercaptopolydiorganosiloxane such as $\{HSCH_2CH_2CH_2(CH_3)SiO\}_4$ to the reaction mixture to introduce pendant-functional groups into the mercaptopolydiorganosiloxane. Likewise, the compounds and techniques used in preparing pendant-functional mercaptopolydiorganosiloxanes can be used to produce hybrid-functional types by substituting mercapto-functional endblocking units, which can be introduced in the form of a disiloxane such as sym-tetramethyl bis(3-mercaptopropyl)disiloxane, in place of non-functional endblocking units, such as those introduced in the form of hexamethyldisiloxane, in the reaction mixture.

Cyclic mercaptopolydiorganosiloxanes can be prepared by various methods, one of which involves preparing the corresponding chloroalkylsilane, such as 3-chloropropylmethyldichlorosilane, and hydrolyzing the silanes to form a mixture of linear and cyclic polydiorganosiloxanes. If desired, the ratio of cyclic to linear polydiorganosiloxanes can be altered by heating in the presence of an acidic catalyst for a period of time, during which time a portion of the cyclic polydiorganosiloxanes formed is being removed by distillation to shift the equilibrium of the reaction in the direction which favors the formation of cyclic polydiorganosiloxanes. Then, for example, Viventi teaches that the chloroalkyldiorganosiloxanes can be reacted with sodium sulfohydride to produce mercaptopolydiorganosiloxanes. Mercapto-functional silanes containing alkoxy groups such as 3-mercaptopropylmethyldimethoxysilane can also be hydrolyzed at about 40°–50° C. in the presence of an acidic catalyst and vacuum-stripped at 120° C. to remove alcohol and other undesirable volatiles present. Such mixtures can also be referred to as, for example, the 3-mercaptopropylmethyl hydrolyzate of 3-mercaptopropylmethyldimethoxysilane. Other means for preparing cyclic mercaptopolydiorganosiloxanes will be apparent to persons skilled in the art.

The production of a type of mercapto-functional organosiloxane resins by the partial hydrolysis of mixtures of silanes such as $HSC_nH_{2n}Si(OR^1)_3$ and $R_2{}^3Si(OR^1)_2$ is demonstrated by the Viventi patent. Likewise, mercapto-functional organosiloxane resins result when a sufficient number of siloxane units such as $R^3SiO_{1.5}$ are present in the mercaptoorganosiloxanes taught in the Le Grow patent. The Viventi, Le Grow and Bokerman, et al, patents are hereby incorporated by reference to teach the production of mercaptoorganosiloxanes useful in compositions of the present invention.

Mercaptopolydiorganosiloxanes which contain endblocking units of the formula

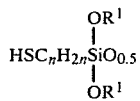

can be prepared by reacting a hydroxyl endblocked polydiorganosiloxane and a (mercaptoalkyl)trialkoxysilane of the formula

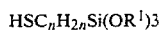

in the presence of solid potassium hydroxide or potassium silanolate catalysts. The potassium silanolate catalyst is preferred for higher viscosity polydiorganosiloxane. The (mercaptoalkyl)trialkoxysilane is preferably used in an excess of about 10 mole percent over stoichiometric amounts. The resulting product is essentially a polydiorganosiloxane endblocked with units of the formula

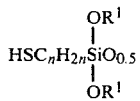

There may be some small amount of units wherein two SiOH groups have reacted with one (mercaptoalkyl)trialkoxysilane molecule, but these amounts are small enough that the character of the endblocked polydiorganosiloxane is not noticeably altered.

Compositions with various properties may be formulated using the above mercaptopolydiorganosiloxanes. Generally, use of only the pendant-functional mercaptopolydiorganosiloxanes results in elastomers with higher modulus values than formulations which additionally include terminal-functional mercaptopolydiorganosiloxanes. The latter give sealants with lower modulus values which are thus capable of much greater elongation before the cured composition tears. As a result, the sole use of pendant-functional mercaptopolydiorganosiloxanes results in cured sealants which are less readily elongated and are therefore primarily useful where there is only a small amount of movement in the joint to be sealed. Blends of the pendant- and terminal-functional mercaptopolydiorganosiloxanes are useful in building sealant formulations where a relatively large degree of joint movement occurs due to varying temperatures. Although such combinations can also be used in many other sealant applications. Formulations which cure to elastomers having elongation values of greater than 1000 percent at break and a modulus value at 100 percent elongation in the range of 210 to 415 kilopascals (kPa) are sometimes called low modulus elastomeric sealants.

The use of hybrid-functional mercaptopolydiorganosiloxanes alone, blends of pendant- and terminal-functional mercaptopolydiorganosiloxanes, or blends of hybrid- and terminal-functional mercaptopolydiorganosiloxanes can result in a low modulus elastomeric sealant product with excellent unprimed adhesion to a large number of building substrates. To prepare such low modulus elastomeric sealant compositions, it is preferred that the mercaptopolydiorganosiloxanes utilized are those described above wherein each $R^1$ and $R^3$ is methyl, n is 3, the number average molecular weight of the mercaptopolydiorganosiloxanes utilized is less than 100,000 and the weight percent mercapto groups in the hybrid-functional mercaptopolydiorganosiloxane or in the total blend is in the range of 0.1 to 0.45 weight percent. It should be noted that cured elastomers with higher modulus values, especially those formulated with pendant-functional mercaptopolydiorganosiloxanes alone, do not have exceptionally good adhesion to substrates and can require the use of primers in certain applications.

Fillers may be used with the compositions of this invention, but are not required. Extending fillers can preferably be used in amounts of 10 to 200 parts by weight per 100 parts by weight of mercaptoorganosiloxane, especially in the elastomeric sealant formulations. Suitable extending fillers can be titanium dioxide, calcium carbonate, talc, clay, ground or crushed quartz, diatomaceous earth, fibrous fillers such as glass or asbestos and the like.

Reinforcing fillers such as fume silica, surface-treated fume silica, carbon black and the like may also be used. As is well-known in the art, reinforcing fillers cannot be used in as large an amount as extending fillers can be used, thus any formulation including such fillers would not contain more than 70 parts by weight of reinforcing fillers per 100 parts by weight of the mercaptoorganosiloxanes and preferably, from 5 to 30 parts. Extending fillers can also be included in formulations containing reinforcing fillers in amounts of up to 200 parts by weight per 100 parts by weight of the mercaptoorganosiloxanes less the amount of reinforcing filler present. Other additives such as coloring pigments, fire-retarding compounds and the like are also contemplated as being useful in the present invention.

Iron carbonyl compounds contemplated as being useful as catalysts in the practice of the present invention are $Fe(CO)_5$, $Fe_2(CO)_9$, $Fe_3(CO)_{12}$, dicyclopentadienyldiiron tetracarbonyl or $\{(C_5H_5)Fe(CO)_2\}_2$, butadieneiron tricarbonyl or $(C_4H_6)Fe(CO)_3$ and cyclohexadieneiron tricarbonyl or $(C_6H_8)Fe(CO)_3$. The amount of catalyst necessary is not critical. Any catalytic amount can be employed which will adequately polymerize or cure the compositions in the presence of oxygen to result in a product which is satisfactory for the desired end use. Changing the level of catalyst may alter the polymerization or cure rate and can alter the properties of the cured product, especially in the elastomeric products. We have found that a range of 0.1 to 6 parts by weight of iron carbonyl compound per 100 parts by weight of mercaptoorganosiloxanes is usually sufficient. The preferred iron carbonyl catalyst is $Fe(CO)_5$.

As noted previously, iron carbonyl compounds are affected by exposure to oxygen and thus their catalytic activity may be reduced during handling if steps are not taken to protect them from such exposure. Thus, to aid in the handling of the compounds and to further speed the incorporation of the catalyst into the composition, it is preferable to first dissolve the compounds in a hydrophobic solvent or diluent such as toluene, mineral oil or a trimethylsiloxy endblocked polydimethylsiloxane fluid. A 20 weight percent solution of iron pentacarbonyl ($Fe(CO)_5$) in a trimethylsiloxy endblocked polydimethylsiloxane fluid is preferred. Iron carbonyl compounds are well-known in the art and methods for their preparation may be found in the literature, for example, in Organometallic Compounds, Volume I, Dub, editor, Springer-Verlag, N.Y. (1966) and Handbook of Organometallic Compounds, Hagihara, Kumada and Okawara, editors, W. A. Benjamin Co., N.Y., pp. 822–903 (1968), which are both hereby incorporated by reference to teach the production of the above iron carbonyl compounds. Iron carbonyl compounds are known to be toxic and somewhat volatile, therefore care should be exercised when such compounds are handled and adequate ventilation should be provided during the polymerization or cure of these compositions.

We have discovered that certain compounds which are capable of undergoing reduction-oxidation reactions, or redox compounds, can be used with iron carbonyl-catalyzed mercaptoorganosiloxanes to increase the cross-link density of the cured compositions when compared to the same composition without redox compounds which was cured for the same period of time. Increases in cross-link density are generally evidenced by higher durometer and tensile strength values as increasing amounts of redox compounds are included in the formulation. Redox compounds also appear to accelerate the rate of polymerization or cure of compositions catalyzed by iron carbonyl compounds. Redox compounds found to be useful for this purpose are copper (II) sulfate which can be either anhydrous or a hydrated species such as copper (II) sulfate pentahydrate and iron (III) oxide. We have found that 0.1 to 6 parts by weight of the redox compound per 100 parts by weight of mercaptoorganosiloxanes is sufficient. Preferably, the weight of redox compound added is equal to the weight of iron carbonyl compound added.

While these compounds can be used in resins to increase the cross-link density and thereby produce harder resins, redox compounds are to be preferred when the desired end product is a low modulus elastomeric sealant. Such sealants, which generally also possess excellent unprimed adhesion to common building substrates such as glass, metal and concrete, can easily be formulated by including redox compounds in the formulations. Furthermore, the use of redox compounds enables one to produce low modulus elastomeric sealant compositions from blends of terminal-functional and pendant-functional mercaptopolydiorganosiloxanes which do not cure to compositions useful as low modulus sealants when a redox compound is not included in the formulation.

It is believed that compositions of the present invention polymerize or cure to form higher molecular weight products by the formation of disulfide (—SS—) bonds upon exposure to oxygen due to the action of the metal carbonyl catalyst.

The compositions polymerize or cure rapidly at room temperature and appear to cure from the surface in contact with oxygen inward. Heating will accelerate the rate of cure in the manner that most chemical reactions are accelerated by a rise in temperature and this can be used to advantage where a protective coating of resin is being applied to a substrate. Compositions containing low amounts of mercapto groups, especially elastomeric sealants containing less than 2 weight percent mercapto groups are essentially free of any offensive odor. Another advantage for utilizing compositions containing redox compounds is that such compositions appear to form products with a higher cross-link density in a given period of time than do the same compositions without redox compounds. In practicing the present invention, a formulator may select polymers and fillers which, together with the proper level of catalyst and redox compound, will yield a variety of products such as encapsulating gels, hard resins, coatings and elastomeric sealants.

The following examples are intended as being merely illustrative and are not to be construed as limiting the scope of the present invention, which is properly defined by the appended claims. In the following examples, all parts and percentages are by weight unless otherwise noted.

EXAMPLE 1

The use of redox compounds such as iron (III) oxide ($Fe_2O_3$) and copper (II) sulfate ($CuSO_4$) to improve the properties of a composition containing only a pendant-functional mercaptopolydiorganosiloxane is demonstrated in this example. The mercaptopolydiorganosiloxane was prepared by adding 29.8 grams of hexamethyldisiloxane and 147.8 grams of the 3-mercaptopropyl hydrolyzate of 3-mercaptopropylmethyldimethoxysilane to a 2 liter, 3-necked flask equipped with a stirrer, thermometer, condenser and nitrogen sparge tube. The contents were heated to 70° C. with stirring and dry nitrogen gas purging. At 70° C., 0.2 milliliters (ml) of trifluoromethanesulfonic acid was added and 250 ml (~238 grams) of a cyclic polydimethylsiloxane mixture having a formula $(Me_2SiO)_x$ where x has an average value of 4 was added over a period of 30 minutes. When the addition was complete, 0.39 ml of trifluoromethanesulfonic acid was added and the temperature was raised to 85° C. Then, 613 ml (~584 grams) of the cyclic polydimethylsiloxane mixture was added over a 45 minute period. The contents were allowed to stir for 24 hours at 85° C. The contents were then cooled and 5.9 grams of sodium bicarbonate was added and the contents were allowed to stir for 24 hours at 22° C. to neutralize the acid. The resulting product was then pressure filtered through diatomaceous earth.

Then 300 grams of this product was mixed with 3000 grams of the above cyclic polydimethylsiloxane mixture (22° C.) before determining the physical properties tabulated below. The durometer was determined by ASTM-D-2240 and the tensile strength, percent elongation and modulus at 100 percent elongation were determined by ASTM-D-412.

TABLE I

Effect of Redox Compounds

| Redox Compound | Skin-over Time (minutes) | Tack-free Time (minutes) | Durometer (Shore A) | Tensile Strength (kPa) | Elongation (%) | Modulus @ 100% Elongation (kPa) |
| --- | --- | --- | --- | --- | --- | --- |
| None | — | — | 30 | 965 | 260 | 758 |
| $CuSO_4$ | 9 | 15 | 34 | 1103 | 170 | 1034 |
| $Fe_2O_3$ | 9 | 17 | 38 | 1069 | 170 | 1000 | and heated to 85° C. with stirring and nitrogen gas purging. At 85° C., 1.9 ml of trifluoromethanesulfonic acid was added and the contents were stirred for 24 hours at 85° C. The contents were then cooled and neutralized with 19.5 grams of sodium bicarbonate. The contents were pressure filtered through diatomaceous earth and vacuum distilled to remove volatile matter at a pressure of less than 2 millimeters of mercury pressure until the distillation pot reached 160° C. The mercaptopolydiorganosiloxane (hereinafter referred to as Polymer A) obtained after removal of the volatile portion was a trimethylsiloxy-endblocked copolymer consisting of dimethylsiloxane and 3-mercaptopropylmethylsiloxane units, had a viscosity of 17.00 Pascal·seconds (Pa·s) at 25° C. and contained 0.41 weight percent mercapto (—SH) groups as determined by the iodine titration test. The iodine titration test used was the method outlined in Critchfield, Organic Functional Group Analysis, MacMillan Co., N.Y., p. 166 (1963). The number average molecular weight of Polymer A was 104,000 as determined by fast gel permeation chromatographic analysis using polydimethylsiloxane reference standards.

A base consisting of 100 parts of the above mercaptopolydiorganosiloxane and 150 parts of a calcium carbonate filler was prepared by milling on a 3-roll mill. This base was then placed in a SemKit ® tube (commercially available from Semco, Inc., division of Products Research and Chemical Corp., Glendale, Calif.) which is a cylinder having the appearance of a tube used for caulking compounds, contains a means for stirring the contents and is designed to be placed in a vacuum to remove volatile materials from compositions placed inside the tube. Since the base was milled in the presence of air, the base was de-aired by subjecting it to a vacuum of 30 millimeters of mercury for 30 minutes. A seal was then placed on the back of the tube. 4.8 parts of a 20 percent solution of $Fe(CO)_5$ in a trimethylsiloxy endblocked polydimethylsiloxane fluid with a viscosity of 0.05 Pa·s at 25° C. was injected into the sealed SemKit ® tube and the stirrer was used to evenly incorporate the catalyst solution into the base. One composition of the above and two more which additionally contained 3 parts of $Fe_2O_3$ and anhydrous $CuSO_4$, respectively, were prepared. The redox compounds were added with the filler during the preparation of the base. The samples were extruded into a mold and spread to a thickness of 1.6 millimeters (mm) and allowed to cure for 7 days in the presence of air at room temperature The above data indicate that the presence of redox compounds results in more highly cross-linked products as indicated by higher durometer values for compositions containing redox compounds.

EXAMPLE 2

The improvement in physical properties resulting from the addition of redox compounds such as $Fe_2O_3$ and $CuSO_4$ is most evident when low modulus elastomeric sealant compositions without redox compounds are compared to those containing redox compounds. In this example, various mixtures of pendant- and terminal-functional mercaptopolydiorganosiloxanes were employed. The pendant-functional mercaptopolydiorganosiloxane was Polymer A and the terminal-functional mercaptopolydiorganosiloxane was a linear polydimethylsiloxane end-blocked with 3-mercaptopropyldimethylsiloxy units, contained 0.11 percent mercapto groups and had a viscosity of 40.50 Pa·s at 25° C. and had a number average molecular weight of 40,770 (hereinafter referred to as Polymer (B). Polymer B was prepared by mixing 2984.1 grams of the same type of cyclic polydimethylsiloxane mixture used in Example 1 and 15.8 grams of sym-tetramethyl bis(3-mercaptopropyl)disiloxane together, the mixture was then stirred and heated to 65° C. At 65° C., 1.77 ml of trifluoromethanesulfonic acid was carefully added and the mixture was stirred another 3 hours. Another 300 grams of the cyclic polydimethylsiloxane mixture was then added and heating was continued for another 2 hours during which time 175 additional grams of the cyclic polydimethylsiloxane mixture was added. Thirty grams of sodium bicarbonate was then added and the mixture was stirred overnight at room temperature.

One liter of toluene was then added and the solution was pressure filtered through diatomaceous earth. The filtrate was vacuum distilled to remove volatile matter by heating it to 150° C. at about 10 millimeters of mercury pressure to recover Polymer B.

The parts of terminal-functional (Polymer B) to pendant-functional (Polymer A) mercaptopolydiorganosiloxane are listed in Table II. A total of 100 parts of the mercaptopolydiorganosiloxane mixture was used, while the filler, iron carbonyl catalyst, and redox compounds are identical to that used in the formulation of Example 1. Likewise, the compounding and curing procedures used in Example 1 were followed in the example and the results are tabulated in Table II.

TABLE II

Redox Compounds in Low Modulus Sealants

| | Polymer B/Polymer A Parts by Weight | | | | | | | | | | | |
|---|---|---|---|---|---|---|---|---|---|---|---|---|
| | 50/50 | | | 75/25 | | | 85/15 | | | 95/5 | | |
| | None | CuSO$_4$ | Fe$_2$O$_3$ | None | CuSO$_4$ | Fe$_2$O$_3$ | None | CuSO$_4$ | Fe$_2$O$_3$ | None | CuSO$_4$ | Fe$_2$O$_3$ |
| Skin-over Time (minutes) | — | 15 | 17 | — | 20 | 33 | — | 31 | 38 | No Cure | 30 | 50 |
| Tack-free Time (minutes) | — | 22 | 29 | — | 27 | 45 | — | 40 | 57 | No Cure | 40 | 62 |
| Durometer (Shore A) | 18 | 30 | 30 | 14 | 27 | 23 | 5 | 20 | 20 | No Cure | 17 | 17 |
| Tensile Strength (kPa) | 896 | 965 | 931 | 724 | 1034 | 896 | 207 | 965 | 896 | No Cure | 586 | 552 |
| Elongation (%) | 670 | 450 | 370 | 875 | 750 | 760 | 185 | 1030 | 1060 | No Cure | 1303 | 1150 |
| Modulus @ 100% Elongation (kPa) | 379 | 758 | 724 | 241 | 586 | 414 | 172 | 379 | 379 | No Cure | 276 | 310 |

EXAMPLE 3

This comparative example was designed to show the effect of various concentrations of CuSO$_4$ redox compound on the properties of a cured low modular sealant formulation. A terminal-functional mercaptopolydimethylsiloxane was prepared for use in this example according to the following procedure. The following ingredients were added to a 5 liter, 3-necked flask equipped with a stirrer, condenser, thermometer and a nitrogen sparge tube: 2988.9 grams of the same type of cyclic polydimethylsiloxane mixture used in Example 1 and 11.1 grams of sym-tetramethyl bis(3-mercaptopropyl)disiloxane. The mixture was stirred and purged with dry nitrogen gas while heating to 65° C. At a constant 65° C., 1.77 ml (~3 grams) of trifluoromethanesulfonic acid was added. After 15 minutes, a noticeable increase in viscosity was noted. After 4.6 hours of reaction in the presence of the acid catalyst, 6 microdrops (~0.06 grams) of distilled water was added to the mixture. After another 1.9 hours at 65° C., the mixture was cooled, neutralized with 17.7 grams of sodium bicarbonate and allowed to stir overnight at room temperature. The mixture was diluted with an equal volume of toluene, pressure filtered through a charcoal filter and vacuum distilled to remove volatile matter at less than one millimeter of mercury pressure to a pot temperature of 150° C. to recover a 3-mercaptopropyldimethylsiloxy-endblocked polydimethylsiloxane (hereinafter referred to as Polymer C). Polymer C contained 0.14 percent mercapto groups (determined by titration with silver nitrate solution), had a viscosity of 41.01 Pa.s at 25° C. and had a number average molecular weight of 49,600.

The following compositions were prepared and cured according to the method used in Example 1: 87 parts of Polymer C, 13 parts of Polymer A, 150 parts of a calcium carbonate filler, 4.8 parts of Fe(CO)$_5$ catalyst solution used in Example 1 and various parts of anhydrous CuSO$_4$, the amounts of which are listed in Table III. The results are summarized in Table III.

TABLE III

Effect of CuSO$_4$ On Cured Low Modulus Sealant Compositions

| Parts of CuSO$_4$[1] | Skin-over Time (minutes) | Tack-free Time (minutes) | Durometer (Shore A) | Tensile Strength (kPa) | Elongation (%) | Modulus @ 100% Elongation (kPa) |
|---|---|---|---|---|---|---|
| None[2] | 73 | ~95 | 8 | 310 | 720 | 138 |
| 0.33 | 38 | 44 | 15 | 655 | 1350 | 228 |
| 1 | 32 | 40 | 15 | 793 | 1430 | 262 |
| 3 | 25 | 33 | 18 | 862 | 1350 | 276 |
| 5 | 15 | 25 | 18 | 827 | 1230 | 296 |

[1] by weight per 100 parts by weight of mercaptopolydiorganosiloxane
[2] comparative example

EXAMPLE 4

The type of copper (II) sulfate used in compositions of the present invention can affect the rate of cure. The use of copper (II) sulfate pentahydrate (penta. in table below) results in compositions which exhibit faster skin-over and tack-free times than do the same compositions which contain anhydrous copper (II) sulfate (Anhyd. in table below). The following compositions were prepared using the procedure outlined in Example 1: a total of 100 parts by weight of Polymer A and Polymer B, the amounts of which are shown below; 150 parts by weight of a calcium carbonate filler; 3 parts by weight of either anhydrous copper (II) sulfate or copper (II) sulfate pentahydrate and 4.8 parts by weight of the same type of 20 percent Fe(CO)$_5$ solution used in Example 1. the extruded sample prepared using an 85/15 blend of Polymer B/Polymer A and copper (II) sulfate pentahydrate contained some lumps of the copper (II) sulfate after mixing. The results are tabulated below.

| | Polymer B/Polymer A Parts By Weight | | | |
|---|---|---|---|---|
| | 85/15 | | 95/5 | |
| Copper (II) Sulfate | Anhyd. | Penta. | Anhyd. | Penta. |
| Skin-over time (minutes) | 31 | 12 | 30 | 16 |
| Tack-free time (minutes) | 40 | 18 | 40 | 20 |
| Durometer (Shore A) | 20 | 23 | 17 | 15 |
| Tensile Strength (kPa) | 965 | 827 | 586 | 517 |
| Elongation (percent) | 1030 | 940 | 1303 | 1210 |
| Modulus @ 100 percent Elongation (kPa) | 379 | 414 | 276 | 276 |

That which is claimed is:

1. A composition of matter, stable in the absence of oxygen, which consists essentially of a product obtained by mixing the following substantially in the absence of oxygen (A) 100 parts by weight of at least one mercapto-functional organosiloxane, said mercapto-functional organosiloxane having an average of at least two mercapto-functional siloxane units per molecule selected from the group consisting of mercapto-functional siloxane units of the average unit formula $$(HSC_nH_{2n})_xR_y^4SiO_{\frac{4-x-y}{2}} \text{ and } \begin{array}{c} HSCH-CH_2 \\ | \\ CH_2-CH_2 \end{array}\!\!\!\!\!\!\!\!\begin{array}{c} R_w^4 \\ | \\ \end{array}\!\!\!SiO_{\frac{2-w}{2}},$$

any other siloxane units present having the average unit formula $$R^2_zSiO_{(4-z)/2},$$

wherein
each $R^2$ is a hydroxyl radical or an organic radical selected from the group consisting of $R^4$ and 3,3,3-trifluoropropyl radicals,
each $R^4$ is $R^3$ or $OR^1$,
each $R^3$ is an alkyl radical of 1 to 4 inclusive carbon atoms or phenyl radical,
each $R^1$ is an alkyl radical of 1 to 4 inclusive carbon atoms,
n has a value of from 2 to 4 inclusive,
w has a value of from 0 to 1 inclusive,
x has a value of from 1 to 2 inclusive,
y has a value of from 0 to 2 inclusive,
z has a value of from 0 to 3 inclusive and the sum of x+y has a value of from 1 to 3 inclusive,
and the ratio of the total $R^3$, $HSC_nH_{2n}$—, $$\begin{array}{c} HSCH-CH_2 \\ | \\ CH_2-CH_2 \end{array}\!\!\!\!>$$

and 3,3,3-trifluoropropyl radicals to silicon atoms in the mercapto-functional organosiloxane is in the range of 0.98/1 to 3.00/1;

(B) a catalytic amount of an iron carbonyl catalyst selected from the group consisting of $Fe(CO)_5$, $Fe_2(CO)_9$, $Fe_3(CO)_{12}$, dicyclopentadienyldiiron tetracarbonyl, butadieneiron tricarbonyl, and cyclohexadieneiron tricarbonyl;

(C) 0 to 200 parts by weight of at least one filler; and (D) 0.1 to 6 parts by weight of a redox compound selected from the group consisting of copper (II) sulfate and iron (III) oxide.

2. The composition as claimed in claim 1 wherein the catalytic amount of (B) is in a range of 0.1 to 6 parts by weight of iron carbonyl catalyst per 100 parts by weight of the mercapto-functional organosiloxane and the iron carbonyl catalyst is $Fe(CO)_5$.

3. The composition as claimed in claim 2 wherein the mercapto-functional organosiloxane is at least one pendant-functional mercaptopolydiorganosiloxane containing $R^3_3SiO_{0.5}$ endblocking siloxane units and mercapto-functional siloxane units selected from the group consisting of $$\begin{array}{cc} C_nH_{2n}SH & \\ | & \\ R^3SiO & \end{array} \text{ and } \begin{array}{c} HSCH-CH_2 \\ | \\ CH_2-CH_2 \end{array}\!\!\!\!>\!\!SiO,$$

any remaining siloxane units being $R_2^3SiO$, wherein the average number of mercapto-functional siloxane units per molecule is greater than 2 and the number average molecular weight of the pendant-functional mercaptopolydiorganosiloxane is less than 400,000.

4. The composition as claimed in claim 3 wherein $R^3$ is methyl, n is 3, and the pendant-functional mercaptopolydiorganosiloxane has a number average molecular weight of less than 100,000 and contains a sufficient number of mercapto-functional siloxane units to result in a weight percentage of mercapto groups in the range of 0.1 to 2.5 percent based on the total weight of pendant-functional mercaptopolydiorganosiloxane.

5. The composition as claimed in claim 2 wherein the mercapto-functional organosiloxane is at least one hybrid-functional mercaptopolydiorganosiloxane containing two mercapto-functional siloxane units selected from the group consisting of $(HSC_nH_{2n})R_2^3SiO_{0.5}$, $(HSC_nH_{2n})(R^1O)_2SiO_{0.5}$, $$\begin{array}{c} HSCH-CH_2 \\ | \\ CH_2-CH_2 \end{array}\!\!\!\!>\!\!\begin{array}{c} R^3 \\ | \\ \end{array}\!\!SiO_{0.5} \text{ and } \begin{array}{c} HSCH-CH_2 \\ | \\ CH_2-CH_2 \end{array}\!\!\!\!>\!\!\begin{array}{c} OR^1 \\ | \\ \end{array}\!\!SiO_{0.5},$$

and at least one mercapto-functional siloxane unit selected from the group consisting of $(HSC_nH_{2n})R^3SiO$ and $$\begin{array}{c} HSCH-CH_2 \\ | \\ CH_2-CH_2 \end{array}\!\!\!\!>\!\!SiO,$$

any remaining units being $R_2^3SiO$, wherein the number average molecular weight of the hybrid-functional mercaptopolydiorganosiloxane is less than 400,000.

6. The composition as claimed in claim 2 wherein the mercapto-functional organosiloxane is at least one hybrid-functional mercaptopolydiorganosiloxane containing two mercapto-functional siloxane units selected from the group consisting of $(HSCH_2CH_2CH_2)(CH_3)_2SiO_{0.5}$ and $$\begin{array}{c} HSCH-CH_2 \\ | \\ CH_2-CH_2 \end{array}\!\!\!\!>\!\!\begin{array}{c} CH_3 \\ | \\ \end{array}\!\!SiO_{0.5}$$

and at least one mercapto-functional siloxane unit selected from the group consisting of $(HSCH_2CH_2CH_2)(CH_3)SiO$ and $$\begin{array}{c} HSCH-CH_2 \\ | \\ CH_2-CH_2 \end{array}\!\!\!\!>\!\!SiO,$$

any remaining units being $(CH_3)_2SiO$, wherein the hybrid-functional mercaptopolydiorganosiloxane has a number average molecular weight of less than 100,000 and contains a sufficient number of mercapto-functional siloxane units to result in a weight percentage of mercapto groups in the range of 0.1 to 3 percent based on the total weight of hybrid-functional mercaptopolydiorganosiloxane.

7. The composition as claimed in claim 3 having admixed therewith at least one terminal-functional mercaptopolydiorganosiloxane containing mercapto-functional siloxane units selected from the group consisting of $HSC_nH_{2n}(R^3)_2SiO_{0.5}$, $HSC_nH_{2n}(R^1O)_2SiO_{0.5}$,

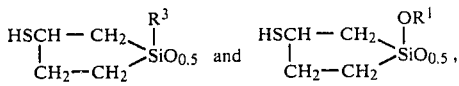

any remaining siloxane units being $R_2{}^3SiO$, wherein the number average molecular weight of the terminal-functional mercaptopolydiorganosiloxane is less than 400,000.

8. The composition as claimed in claim 4 having admixed therewith at least one terminal-functional mercaptopolydiorganosiloxane containing mercapto-functional siloxane units selected from the group consisting of $(HSCH_2CH_2CH_2)(CH_3)_2SiO_{0.5}$ and

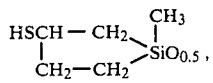

any remaining siloxane units being $(CH_3)_2SiO$, wherein said terminal-functional mercaptopolydiorganosiloxane has a number average molecular weight of less than 100,000 and contains a sufficient number of mercapto-functional siloxane units to result in a weight percentage of mercapto groups in the range of 0.07 to 0.5 percent based on the total weight of terminal-functional mercaptopolydiorganosiloxane and the total weight percent of mercapto groups in the admixed mercaptopolydiorganosiloxanes is in the range of 0.1 to less than 2.5 percent of the total weight of the admixed mercaptopolydiorganosiloxanes.

9. The composition as claimed in claim 5 having admixed therewith at least one terminal-functional mercaptopolydiorganosiloxane containing mercapto-functional siloxane units selected from the group consisting of $HSC_nH_{2n}(R^3)_2SiO_{0.5}$, $HSC_nH_{2n}(R^1O)_2SiO_{0.5}$,

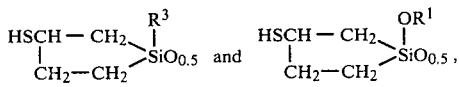

any remaining siloxane units being $R_2{}^3SiO$, wherein the number average molecular weight of the terminal-functional mercaptopolydiorganosiloxane is less than 400,000.

10. The composition as claimed in claim 6 having admixed therewith at least one terminal-functional mercaptopolydiorganosiloxane containing mercapto-functional siloxane units selected from the group consisting of $(HSCH_2CH_2CH_2)(CH_3)_2SiO_{0.5}$ and

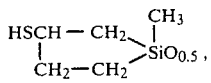

any remaining siloxane units being $(CH_3)_2SiO$, wherein said terminal-functional mercaptopolydiorganosiloxane has a number average molecular weight of less than 100,000 and contains a sufficient number of mercapto-functional siloxane units to result in a weight percentage of mercapto groups in the range of 0.07 to 0.5 percent based on the total weight of terminal-functional mercaptopolydiorganosiloxane and the total weight percent of mercapto groups in the admixed mercaptopolydiorganosiloxanes is in the range of 0.1 to less than 3.0 percent of the total weight of the admixed mercaptopolydiorganosiloxanes.

11. A composition which comprises a product formed upon exposure of the composition of claim 2 to oxygen.

12. A cured composition which comprises an elastomer formed upon exposure of the composition of claim 4 to oxygen.

13. A cured composition which comprises an elastomer formed upon exposure of the composition of claim 6 to oxygen.

14. A cured composition which comprises an elastomer formed upon exposure of the composition of claim 8 to oxygen.

15. A cured composition which comprises an elastomer formed upon exposure of the composition of claim 10 to oxygen.

16. A method of forming a higher molecular weight product which consists essentially of the steps of
(I) mixing
(a) 100 parts by weight of at least one mercapto-functional organosiloxane, said mercapto-functional organosiloxane having an average of at least two mercapto-functional siloxane units per molecule selected from the group consisting of mercapto-functional siloxane units of the average unit formula

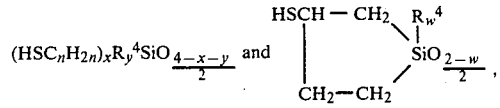

any other siloxane units present having the average formula $R_z{}^2SiO_{(4-z)/2}$,
wherein
each $R^2$ is a hydroxyl radical or an organic radical selected from the group consisting of $R^4$ and 3,3,3-trifluoropropyl radicals,
each $R^4$ is $R^3$ or $OR^1$,
each $R^3$ is an alkyl radical of 1 to 4 inclusive carbon atoms or phenyl radical,
each $R^1$ is an alkyl radical of 1 to 4 inclusive carbon atoms,
n has a value of from 2 to 4 inclusive,
w has a value of from 0 to 1 inclusive,
x has a value of from 1 to 2 inclusive,
y has a value of from 0 to 2 inclusive,
z has a value of from 0 to 3 inclusive and the sum of x+y has a value of from 1 to 3 inclusive,
and the ratio of the total $R^3$, $HSC_nH_{2n}$—,

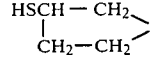

and 3,3,3-trifluoropropyl radicals to silicon atoms in the mercapto-functional organosiloxane is in the range of 0.98/1 to 3.00/1; and
(b) a catalytic amount of an iron carbonyl catalyst selected from the group consisting of $Fe(CO)_5$, $Fe_2(CO)_9$, $Fe_3(CO)_{12}$, dicyclopentadienyldiiron tetracarbonyl, butadieneiron tricarbonyl and cyclohexadieneiron tricarbonyl;

(c) 0.1 to 6 parts by weight of a redox compound selected from the group consisting of copper (II) sulfate and iron (III) oxide, to form a mixture, and (II) exposing said mixture to oxygen.

17. The method as claimed in claim 16 wherein the amount of iron carbonyl catalyst is in a range of 0.1 to 6 parts by weight per 100 parts by weight of (I)(a) and the iron carbonyl catalyst is Fe(CO)$_5$.

18. The method as claimed in claim 17 wherein the mixture of (I) additionally contains up to 200 parts by weight of at least one filler per 100 parts by weight of (I)(a).

19. A composition which comprises the higher molecular weight product obtained in accordance with the method of claim 16.

20. A composition which comprises the higher molecular weight product obtained in accordance with the method of claim 17.

21. A composition which comprises the higher molecular weight product obtained in accordance with the method of claim 18.

22. The composition as claimed in claim 1 which contains at least one filler.

23. The composition as claimed in claim 2 which contains at least one filler.

24. The composition as claimed in claim 11 which contains at least one filler.

* * * * *

UNITED STATES PATENT AND TRADEMARK OFFICE
CERTIFICATE OF CORRECTION

PATENT NO. : 4,293,676
DATED : October 6, 1981
INVENTOR(S) : Gary R. Homan et al.

It is certified that error appears in the above—identified patent and that said Letters Patent is hereby corrected as shown below:

Column 9, line 23, the formula "$HSC_nH_{2n}Si(OR^1)3$" should read

--$HSC_nH_{2n}Si(OR^1)_3$--.

Column 9, line 24, the formula "$R_2^3Si(OR^1)2$" should read

--$R_2^3Si(OR^1)_2$--.

Column 9, line 45, the formula "$HSC_nH_{2n}Si(OR^1)3$" should read

--$HSC_nH_{2n}Si(OR^1)_3$--.

UNITED STATES PATENT AND TRADEMARK OFFICE
CERTIFICATE OF CORRECTION

PATENT NO. : 4,293,676
DATED : October 6, 1981
INVENTOR(S) : Gary R. Homan et al.

It is certified that error appears in the above-identified patent and that said Letters Patent are hereby corrected as shown below:

Column 14, 41, the phrase "as Polymer (B)." should read

--as Polymer B).--.

Column 15, line 62, the expression "Pa.s" should read

--Pa•s--.

Signed and Sealed this

Second Day of November 1982

[SEAL]

Attest:

GERALD J. MOSSINGHOFF

Attesting Officer

Commissioner of Patents and Trademarks